United States Patent
Dickinson et al.

(10) Patent No.: US 11,661,485 B2
(45) Date of Patent: May 30, 2023

(54) HIGH PERFORMANCE FIBERS COMPOSITE SHEET

(71) Applicant: Avient Protective Materials B.V., Geleen (NL)

(72) Inventors: Brad Alan Dickinson, Echt (NL); Harm Van Der Werff, Echt (NL); Raul Marcelino Perez Graterol, Echt (NL); Petrus Henricus Maria Elemans, Echt (NL); Leonardus Gerardus Bernardus Bremer, Echt (NL); Francois Antoine Maria Op Den Buijsch, Echt (NL); Roelof Marissen, Echt (NL)

(73) Assignee: AVIENT PROTECTIVE MATERIALS B.V., Geleen (NL)

( * ) Notice: Subject to any disclaimer, the term of this patent is extended or adjusted under 35 U.S.C. 154(b) by 580 days.

(21) Appl. No.: 16/500,199

(22) PCT Filed: Mar. 19, 2018

(86) PCT No.: PCT/EP2018/056809
§ 371 (c)(1),
(2) Date: Oct. 2, 2019

(87) PCT Pub. No.: WO2018/184821
PCT Pub. Date: Oct. 11, 2018

(65) Prior Publication Data
US 2021/0115203 A1 Apr. 22, 2021

Related U.S. Application Data

(60) Provisional application No. 62/482,256, filed on Apr. 6, 2017.

(30) Foreign Application Priority Data

Jul. 25, 2017 (EP) .................... 17182931

(51) Int. Cl.
| | | |
|---|---|---|
| C08J 5/04 | (2006.01) | |
| B32B 5/12 | (2006.01) | |
| B32B 27/30 | (2006.01) | |
| C08J 5/18 | (2006.01) | |
| F41H 5/04 | (2006.01) | |

(52) U.S. Cl.
CPC ................ *C08J 5/046* (2013.01); *B32B 5/12* (2013.01); *B32B 27/308* (2013.01); *C08J 5/18* (2013.01); *F41H 5/0485* (2013.01); *B32B 2262/0253* (2013.01); *B32B 2307/546* (2013.01); *B32B 2571/02* (2013.01); *C08J 2323/06* (2013.01); *C08J 2423/08* (2013.01)

(58) Field of Classification Search
CPC ..... F41H 5/0478; C08L 23/06; D03D 1/0052; B29K 2023/0683; B32B 2262/0253; B32B 2323/04; B32B 2323/043; C08J 5/046

See application file for complete search history.

(56) References Cited

U.S. PATENT DOCUMENTS

| | | | |
|---|---|---|---|
| 4,403,012 A | 9/1983 | Harpell et al. | |
| 4,623,574 A | 11/1986 | Harpell et al. | |
| 5,766,725 A | 6/1998 | Hogenboom et al. | |
| 7,211,291 B2 | 5/2007 | Harpell et al. | |
| 7,964,267 B1* | 6/2011 | Lyons ................... | B29C 70/202 |
| | | | 156/304.6 |
| 8,999,866 B2 | 4/2015 | Simmelink et al. | |
| 2007/0154707 A1* | 7/2007 | Simmelink ............ | D01D 4/02 |
| | | | 428/105 |
| 2012/0196108 A1 | 8/2012 | Bhatnagar et al. | |
| 2013/0220106 A1* | 8/2013 | Van Elburg ............ | F41H 5/013 |
| | | | 29/402.09 |
| 2017/0010071 A1* | 1/2017 | Van Der Eem ....... | F41H 5/0485 |

FOREIGN PATENT DOCUMENTS

| | | |
|---|---|---|
| CN | 101592459 | 12/2009 |
| CN | 105980809 | 9/2016 |
| EP | 0 205 960 | 10/1990 |
| GB | 2 051 667 | 1/1981 |
| GB | 2 042 414 | 12/1982 |
| WO | 01/73173 | 10/2001 |
| WO | 2004/039565 | 5/2004 |
| WO | 2008/077605 | 7/2008 |
| WO | 2015/118043 | 8/2015 |
| WO | 2017/060469 | 4/2017 |

OTHER PUBLICATIONS

Vasafi et al Effect of High-Density Polyethylene Nanocomposite Compatibilizer Type on the Interfacial Adhesion and Mechanical Properties of Polyethylene Nano-Homocomposites, Journal of Macromolecular Science, Part B: Physics, 54:81-90, 2015,. published on Jan. 2015.*

(Continued)

*Primary Examiner* — Gregory Listvoyb
(74) *Attorney, Agent, or Firm* — Nixon & Vanderhye P.C.

(57) ABSTRACT

The invention relates to a composite sheet, and a ballistic resistant article, comprising unidirectionally aligned high performance polyethylene (HPPE) fibers and a polymeric resin, wherein said polymeric resin comprises a homopolymer or copolymer of ethylene and wherein said polymeric resin has a density as measured according to ISO1183 of between 930 and 980 kg/m3, and a peak melting temperature of from 115 to 140° C.; and said polymeric resin is present in an amount of from 5 to 25% by weight based on the total weight of the composite sheet. It further relates to a method for manufacturing a composite sheet comprising assembling HPPE fibers to a sheet, applying an aqueous suspension of a polymeric resin to the HPPE fibers, partially drying the aqueous suspension, optionally applying a temperature and/ or a pressure treatment to the composite sheet.

17 Claims, No Drawings

(56) References Cited

OTHER PUBLICATIONS

International Search Report for PCT/EP2018/056809, dated Jun. 20, 2018, 4 pages.
Written Opinion of the ISA for PCT/EP2018/056809, dated Jun. 20, 2018, 7 pages.
"DSC Measurement of Polyethylene—The Correlation of polyethylene density and melting", Hitachi High-Tech, Feb. 26, 1986, pp. 1-2.

* cited by examiner

HIGH PERFORMANCE FIBERS COMPOSITE SHEET

This application is the U.S. national phase of International Application No. PCT/EP2018/056809 filed 19 Mar. 2018, which designated the U.S. and claims the benefit of U.S. Patent Application No. 62/482,256 filed 6 Apr. 2017, and claims priority to EP Patent Application No. 17182931.0 filed 25 Jul. 2017, the entire contents of each of which are hereby incorporated by reference.

The present invention concerns a composite sheet comprising high performance polyethylene fibers and a polymeric resin, a ballistic resistant article comprising such a composite sheet and a method for producing such a composite sheet. These composite sheets are amongst others especially adapted to facilitate the manufacture of ballistic resistant articles, amongst which soft ballistic articles for example for vests and moulded ballistic articles for example for vehicle protection, combat helmets, or inserts.

Composite materials comprising high performance polyethylene fibers and a polymeric resin as a matrix material are known from U.S. Pat. Nos. 4,623,574, 5,766,725, 7,211,291 and 8,999,866. U.S. Pat. No. 4,623,574 discloses the manufacture of ballistic resistant sheets by cross plying and stacking a plurality of monolayers comprising unidirectionally aligned extended chain polyethylene fibers and a matrix material, followed by pressing the cross-plied and stacked monolayers into a sheet. Example 1 of U.S. Pat. No. 4,623,574 mentions the production of unidirectional monolayers by helically wrapping polyethylene fibers side-by-side on a drum winder whereby a Kraton D1107 solution is used to coat the unidirectionally aligned fibers. A plurality of the thus obtained unidirectional monolayers was stacked whereby the fiber direction in a monolayer is perpendicular to the fiber direction in an adjacent monolayer. The obtained stack was pressed, followed by cooling to provide a molded ballistic resistant article.

U.S. Pat. No. 4,403,012 describes ballistic resistant articles comprising a network of ultrahigh molecular weight, high strength, high modulus polyethylene or polypropylene fibers. A number of resin systems are used, including polyethylene. Ballistic penetration of such materials was tested.

There is continuous drive towards improved ballistic resistant articles. Not only is penetration resistance (or bullet stopping ability) important, but reduction of so-called "trauma" or back face deformation, rigidity and performance under extreme environmental conditions becomes increasingly important.

An aim of the present invention to provide a composite sheet and a method of manufacturing a composite sheet that at least partly improves one or more of the above-mentioned properties.

The present inventors have found a composite sheet that improves (i.e. reduces) back face deformation, especially at elevated temperatures over known composite materials. In addition, other ballistic resistant properties may be improved, for example the bullet stopping characteristics, or material deterioration by delamination upon use. Further, rigidity of composite sheets may be increased, especially at elevated temperatures.

Further, the present inventors have found a more effective method of applying a polymer resin to a fiber network to manufacture such a composite sheet. The method is simplified and reduces the environmental impact of the process, for example through reduction of emissions, including of organic solvents, and reduction of energy use or providing products that allow easier recycling.

Accordingly, the present invention provides a composite sheet comprising unidirectionally aligned high performance polyethylene (HPPE) fibers and a polymeric resin, wherein said polymeric resin comprises a homopolymer or copolymer of ethylene and wherein said polymeric resin has a density as measured according to ISO1183 of between 930 and 980 kg/m3, and a peak melting temperature of from 115 to 140° C.; and said polymeric resin is present in an amount of from 5 to 25% by weight based on the total weight of the composite sheet.

Accordingly, the present invention further provides a method for manufacturing a composite sheet comprising high performance polyethylene fibers and a polymeric resin comprising the steps of:
a) providing high performance polyethylene (HPPE) fibers
b) assembling the HPPE fibers to form a sheet
c) applying an aqueous suspension of the polymeric resin to the HPPE fibers before, during or after assembling;
d) at least partially drying the aqueous suspension of the polymeric resin applied in step c);
to obtain a composite sheet upon completion of steps a), b), c) and d);
e) optionally applying a temperature in the range from the melting temperature of the resin to 153° C. to the sheet of step c) before, during and/or after step d) to at least partially melt the polymeric resin; and
f) optionally applying a pressure to the composite sheet before, during and/or after step e) to at least partially compact the composite sheet,
wherein the polymeric resin comprises a homopolymer or copolymer of ethylene and wherein said polymeric resin has a density as measured according to ISO1183 of between 930 and 980 kg/m3, and a peak melting temperature of from 115 to 140° C.

It has unexpectedly been found that the composite sheet manufactured according to the method of the present invention may show an improved delamination behaviour when used in a ballistic-resistant article. Said improvement is demonstrated by a reduced back-face deformation of moulded articles comprising a stack of the composite sheets respectively.

By fiber is herein understood an elongated body, the length dimension of which is much greater than the transverse dimensions of width and thickness. Accordingly, the term fiber includes filament, ribbon, strip, band, tape, and the like having regular or irregular cross-sections. The fiber may have continuous lengths, known in the art as filament or continuous filament, or discontinuous lengths, known in the art as staple fibers. A yarn for the purpose of the invention is an elongated body containing many individual fibers. By individual fiber is herein understood the fiber as such. Preferably the HPPE fibers of the present invention are HPPE tapes, HPPE filaments or HPPE staple fibers. More preferably, the HPPE fibers of the present invention are HPPE filaments. More preferably said filament has a cross-sectional area having a width to thickness ratio of at most 3:1, preferably at most 2:1. Most preferably said filament has a cross-section that is substantially circular.

HPPE stands for high performance polyethylene. In the context of the present invention HPPE fibers are understood to be polyethylene fibers with one or more improved mechanical properties, for example tensile strength, abrasion resistance or cut resistance. In a preferred embodiment HPPE fibers are polyethylene fibers with a tensile strength of at least 1.0 N/tex, more preferably at least 1.5 N/tex, more preferably at least 1.8 N/tex, even more preferably at least 2.5 N/tex and most preferably at least 3.5 N/tex. Preferred polyethylene is high molecular weight (HMWPE) or ultra-high molecular weight polyethylene (UHMWPE). The best results are obtained when the high performance polyethylene fibers comprise ultra-high molecular weight polyethylene (UHMWPE) and have a tenacity of at least 2.0 N/tex, more preferably at least 3.0 N/tex.

Preferably the composite sheet of the present invention comprises HPPE fibers comprising high molecular weight polyethylene (HMWPE) or ultra-high molecular weight polyethylene (UHMWPE) or a combination thereof, preferably the HPPE fibers substantially consist of HMWPE and/or UHMWPE. The inventors observed that for HMWPE and UHMWPE the best ballistic performances could be achieved.

In the context of the present invention the expression 'substantially consisting of' HMWPE and/or UHMWPE has the meaning of 'may comprise a minor amount of further species' wherein minor is up to 5 wt %, preferably of up to 2 wt %, more preferably up to 1 wt % of said further species based on the weight of the HPPE fibers.

As used herein, the term "between" specifically excludes the end points of the range defined. For example, "between 930 and 980" specifically excludes both 930 and 980. Conversely the term "from 930 to 980", includes both 930 and 980.

In the context of the present invention the polyethylene (PE) may be linear or branched, whereby linear polyethylene is preferred. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR. The linear polyethylene may further contain up to 5 mol % of one or more other alkenes that are copolymerizable therewith, such as propene, 1-butene, 1-pentene, 4-methylpentene, 1-hexene and/or 1-octene.

The polyethylene is preferably of high molecular weight with an intrinsic viscosity (IV) of at least 2 dl/g; more preferably of at least 4 dl/g, most preferably of at least 8 dl/g. Such polyethylene with IV exceeding 4 dl/g are also referred to as ultra-high molecular weight polyethylene (UHMWPE). Intrinsic viscosity is a measure for molecular weight that can more easily be determined than actual molar mass parameters like number and weigh average molecular weights (Mn and Mw).

The HPPE fibers used in the method according to the invention may be obtained by various processes, for example by a melt spinning process, a gel spinning process or a solid state powder compaction process.

One method for the production of the fibers is a solid state powder process comprising the feeding the polyethylene as a powder between a combination of endless belts, compression-molding the polymeric powder at a temperature below the melting point thereof and rolling the resultant compression-molded polymer followed by solid state drawing. Such a method is for instance described in U.S. Pat. No. 5,091,133, which is incorporated herein by reference. If desired, prior to feeding and compression-molding the polymer powder, the polymer powder may be mixed with a suitable liquid compound having a boiling point higher than the melting point of said polymer. Compression molding may also be carried out by temporarily retaining the polymer powder between the endless belts while conveying them. This may for instance be done by providing pressing platens and/or rollers in connection with the endless belts.

Another method for the production of the fibers used in the invention comprises feeding the polyethylene to an extruder, extruding a molded article at a temperature above the melting point thereof and drawing the extruded fibers below its melting temperature. If desired, prior to feeding the polymer to the extruder, the polymer may be mixed with a suitable liquid compound, for instance to form a gel, such as is preferably the case when using ultra high molecular weight polyethylene.

In the preferred method the fibers used in the invention are prepared by a gel spinning process. A suitable gel spinning process is described in for example GB-A-2042414, GB-A-2051667, EP 0205960 A and WO 01/73173 A1. In short, the gel spinning process comprises preparing a solution of a polyethylene of high intrinsic viscosity, extruding the solution into a solution-fiber at a temperature above the dissolving temperature, cooling down the solution-fiber below the gelling temperature, thereby at least partly gelling the polyethylene of the fiber, and drawing the fiber before, during and/or after at least partial removal of the solvent.

In the described methods to prepare HPPE fibers drawing, preferably uniaxial drawing, of the produced fibers may be carried out by means known in the art. Such means comprise extrusion stretching and tensile stretching on suitable drawing units. To attain increased mechanical tensile strength and stiffness, drawing may be carried out in multiple steps.

In case of UHMWPE fibers, drawing is typically carried out uniaxially in a number of drawing steps. The first drawing step may for instance comprise drawing to a stretch factor (also called draw ratio) of at least 1.5, preferably at least 3.0. Multiple drawing may typically result in a stretch factor of up to 9 for drawing temperatures up to 120° C., a stretch factor of up to 25 for drawing temperatures up to 140° C., and a stretch factor of 50 or above for drawing temperatures up to and above 150° C. By multiple drawing at increasing temperatures, stretch factors of about 50 and more may be reached. This results in HPPE fibers, whereby for ultrahigh molecular weight polyethylene, tensile strengths of 1.5 N/tex to 3 N/tex and more may be obtained.

In step c) of the method of the present invention an aqueous suspension is applied to the HPPE fibers. Such application of suspension takes place before, during or after the fibers are assembled into a sheet. By aqueous suspension is understood that particles of the polymeric resin are suspended in water acting as non-solvent. The concentration of the polymeric resin may widely vary and is mainly limited by the capability to formulate a stable suspension of the resin in water. A typical range of concentration is from 2 to 80% by weight based on the total weight of the aqueous suspension. A preferred concentration is from 4 to 60%, more preferably from 5 to 50%, more preferably from 6 to 40%, more preferably from 10 to 30%, most preferably about 20% by weight based on the total weight of the aqueous suspension. Such preferred higher concentrations of polymeric resin may have the advantage of reducing the time and energy required for the removal of the water from the sheet.

The suspension may further comprise additives such as ionic or non-ionic surfactants, tackifying resins, stabilizers, anti-oxidants, colorants or other additives modifying the properties of the suspension, the resin and or the prepared composite sheet. Preferably the suspension is substantially free of additives that may act as solvents for the polymeric resin. Such suspension may also be referred to as solvent-free. By solvent is herein understood a liquid in which at room temperature the polymeric resin is soluble in an amount of more than 1 wt % whereas a non-solvent is understood a liquid in which at room temperature the polymeric resin is soluble in an amount of less than 0.1 wt %.

The polymeric resin is present in the applied aqueous suspension and ultimately present in the obtained composite sheet of the present invention. The polymeric resin comprises a homopolymer or copolymer of ethylene, also referred to as polyethylene, or a copolymer thereof. The resin may comprise various forms of polyethylene homopolymers or polyethylene copolymers. Suitable comonomers include higher polyolefins, for example propene, 1-butene, isobutylene; as well as hetero atom containing monomers, for example acrylic acid, methacrylic acid, vinyl acetate, maleic anhydride, ethyl acrylate, methyl acrylate. The resin may also comprise α-olefin and cyclic olefin homopolymers and copolymers, or blends thereof.

Preferably the polymeric resin comprises a copolymer of ethylene which may contain as co-monomers one or more olefins having 2 to 12 C-atoms, in particular ethylene, propylene, isobutene, 1-butene, 1-hexene, 4-methyl-1-pentene, 1-octene, acrylic acid, methacrylic acid and vinyl acetate. In the absence of co-monomer in the polymeric resin, a wide variety of polyethylene may be present, for example linear low density polyethylene (LLDPE), very low density polyethylene (VLDPE), low density polyethylene (LDPE), or blends thereof. However, high density polyethylene (HDPE) is preferred.

The resin typically comprises at least 50% by weight of high density polyethylene (HDPE), low density polyethylene (LDPE), linear low density polyethylene (LLDPE) or a combination thereof, based on the total weight of the resin. Preferably it comprises at least 70% by weight of HDPE, LDPE, LLDPE or a combination thereof; more preferably at least 80%; or even at least 90% based on the total weight of the resin.

Furthermore, the polymeric resin may comprise a functionalized polyethylene or copolymer thereof or alternatively the polymeric resin may comprise a functionalized polymer. The presence of such a functionalization in the polymeric resin may substantially enhance the dispersability of the resin and/or allow a reduction of further additives, for example surfactants, for that purpose.

The polymeric resin preferably comprises a copolymer of ethylene and acrylic acid (ethylene acrylic acid copolymer); or a copolymer of ethylene and methacrylic acid (ethylene methacrylic acid copolymer). Ethylene acrylic acid copolymer typically comprises from 5 to 30% by weight acrylic acid monomers, based on the total weight of the ethylene acrylic acid copolymer. Preferably, the ethylene acrylic acid copolymer comprises from 5 to 30% by weight acrylic acid monomers, based on the total weight of the ethylene acrylic acid. Ethylene methacrylic acid copolymer typically comprises from 5 to 30% by weight methacrylic acid monomers, based on the total weight of the ethylene methacrylic acid copolymer. Preferably, the ethylene methacrylic acid copolymer comprises from 5 to 30% by weight methacrylic acid monomers, based on the total weight of the ethylene methacrylic acid copolymer.

The polymeric resin may comprise from 1 to 40% by weight of either ethylene acrylic acid copolymer or ethylene methacrylic acid copolymer, or a combination thereof, based on the total weight of the polymeric resin. Preferably it comprises from 10 to 30%, more preferably from 20 to 25% by weight of ethylene acrylic acid copolymer, ethylene methacrylic acid copolymer or a combination thereof, acid based on the total weight of the resin.

The polymeric resin has a density as measured according to ISO1183 of between 930 and 980 kg/m$^3$. Preferably the density is from 935 to 975 kg/m$^3$, more preferably from 936 to 974 kg/m$^3$, more preferably from 940 to 973 kg/m$^3$, more preferably from 950 to 970 kg/m$^3$, most preferably from 960 to 970 kg/m$^3$. The inventors identified that polymeric resins with densities within said preferred ranges provide an improved, i.e. reduced, back face deformation of a ballistic resistant article comprising the composite sheet of the present invention.

The polymeric resin is a semi-crystalline polyolefin having a peak melting temperature of from 115 to 140° C. Typically, a peak melting temperature of the polymeric resin is from 120 to 138° C., preferably of from 125 to 135° C. Such preferred peak melting temperatures enable production of a composite material with reduced susceptibility to back face deformation, especially when tested at higher temperatures, for example 90° C. or 100° C. The polymeric resin may have more than one peak melting temperature. In such a case, at least one of said melting temperatures falls within the above range. A second and/or further peak melting temperature of the polymeric resin may fall within or outside the temperature ranges. Such may for example be the case when the polymeric resin is a blend of polymers.

Typically, the polymeric resin has a heat of fusion of at least 20 J/g, measured in accordance with ASTM E793, considering the second heating curve at a heating rate of 10 K/min, under nitrogen on a dehydrated sample. In a preferred embodiment of the present invention the polymeric resin has a heat of fusion of at least 30 J/g, preferably at least 40 J/g, more preferably at least 50 J/g, even more preferably at least 60 J/g and most preferably at least 70 J/g. The heat of fusion of the polymeric resin is not specifically limited by an upper value, other than the theoretical maximum heat of fusion for a fully crystalline polyethylene of about 300 J/g. The polymeric resin is a semi-crystalline product with a peak melting temperature in the specified ranges. Accordingly, a reasonable upper limit of the heat of fusion of the polymeric resin is at most 200 J/g, preferably at most 150 J/g.

Typically, the polymeric resin has a storage modulus (E') as measured by dynamic mechanical analysis at 25° C. of at least 200 MPa. Preferably, said storage modulus is at least 300 MPa; more preferably at least 400 MPa; most preferably at least 500 MPa.

Typically, the polymeric resin has a storage modulus (E') as measured by dynamic mechanical analysis at 100° C. of at least 20 MPa. Preferably, said storage modulus is at least 30 MPa; more preferably at least 50 MPa; most preferably at least 70 MPa.

A typical tensile modulus of the polymeric resin at 25° C. is at least 200 MPa. Preferably, said tensile modulus is at least 300 MPa; more preferably at least 400 MPa; most preferably at least 500 MPa. This provides a ballistic resistant article with some structural performance, e.g. a good ear to ear compression resistance for combat helmets. Each application may have an optimum tensile modulus for the resin, related to the specific demands during the use of the application.

The application of the suspension to the HPPE fibers may be done by methods known in the art and may depend amongst others on the moment the suspension is added to the fibers, the nature of the sheet, the concentration and viscosity of the suspension. The suspension may for example be applied to the fibers by spraying, dipping, brushing, transfer rolling or the like, especially depending on the intended amount of polymeric resin present in the composite article of the invention. The amount of suspension present in the sheet may vary widely in function of the intended application of the composite sheet and can be adjusted by the employed method but also the properties of the suspension. For some applications, low amounts of highly concentrated suspensions are employed to reduce the energy and time needed for drying the impregnated sheet. For other applications a low concentration suspension may be advantageous for example to increase the wetting and impregnation speed with low viscous suspensions. Finally, the suspension concentration and quantity should be chosen to provide a composite sheet with the required amounts of polymeric resin present as a matrix material in said composite sheet.

Once the polymeric aqueous suspension is applied to the HPPE fibers, the impregnated fiber, preferably the assembly comprising the impregnated fibers, is at least partially dried. Such drying step involves the removal, e.g. the evaporation of at least a fraction of the water present in the assembly. Preferably the majority, more preferably essentially all water is removed during the drying step, optionally in combination with other components present in the impregnated assembled sheet. Drying, i.e. the removal of water from the suspension, may be done by methods known in the art. Typically the evaporation of water involves an increase of the temperatures of the sheet close to or above the boiling point of water. The temperature increase may be assisted or substituted by a reduction of the pressure and or combined with a continuous refreshment of the surrounding atmosphere. Typical drying conditions are temperatures of from 40 to 130° C., preferably from 50 to 120° C. Typical pressures during the drying process are from 10 to 110 kPa, preferably from 20 to 100 kPa.

The method of the invention may optionally comprise a step wherein the composite sheet is heated to a temperature in the range from the melting temperature of the polymeric resin to 153° C., before, during and/or after the partially drying of the sheet. Heating of the sheet may be carried out by keeping the sheet for a dwell time in an oven set at a heating temperature, subjecting the impregnated sheet to heat radiation or contacting the layer with a heating medium such as a heating fluid, a heated gas stream or a heated surface. Preferably, the temperature is at least 2° C., preferably at least 5° C., most preferably at least 10° C. above the peak melting temperature of the polymeric resin. The upper temperature is at most 153° C., preferably at most 150° C., more preferably at most 145° C. and most preferably at most 140° C. The dwell time is preferably from 2 to 100 seconds, more preferably from 3 to 60 seconds, most preferably from 4 to 30 seconds. In a preferred embodiment, the heating of the sheet of this step overlaps, more preferably is combined with the drying step. It may prove to be practical to apply a temperature gradient to the impregnated sheet whereby the temperature is raised from about room temperature to the maximum temperature of the heating step over a period of time whereby the impregnated sheet will undergo a continuous process from drying of the suspension to at least partial melting of the polymeric resin.

In a further optional step of the method of the invention, the composite sheet is at least partially compacted by applying a pressure. Said pressure may be applied by compression means known in the art, which may amongst others be a calendar, a smoothing unit, a double belt press, or an alternating press. The compression means form a gap through which the layer will be processed. Pressure for compaction generally ranges from 100 kPa to 10 MPa, preferably from 110 to 500 kPa. The compression is preferably performed after at least partially drying the composite sheet, more preferably during or after the optional step of applying a temperature, while the temperature of the sheet is in the range from the melting temperature of the polymeric resin to 153° C.

In a specific embodiment of the invention, a compression of the composite sheet may be achieved by placing the impregnated sheet during or after the impregnation step or the partial drying step under tension on a curved surface. The tension on that curved surface creates pressure between the fibers and surface. Filament winding is a well-known production process for composites where this effect occurs, and it can advantageously be applied in conjunction with the present invention.

A further optional step of the method of the invention comprises adding one or more further layers of polymeric material to the composite sheet after any one of steps c), d), e) or f). Polymeric material means any material comprising a polymer, for example such materials as described herein. A further layer of polymeric material includes a film, for example a low density polyethylene film. A further layer of polymeric material includes a layer comprising unidirectionally aligned high performance polyethylene (HPPE) fibers and a polymeric resin as described herein. Thus the composite sheet may be a multilayered material sheet.

In a preferred embodiment the amount of polymeric resin present in the composite sheet is from 1 to 30% by weight based on the total weight of the composite sheet. Preferably the amount is from 5 to 25%; more preferably from 8 to 18%; more preferably from 10 to 15; most preferably around 13% by weight based on the total weight of the aqueous suspension.

Preferably, the composite sheet of the present invention consists of unidirectionally aligned high performance polyethylene (HPPE) fibers and a polymeric resin, wherein said polymeric resin consists of a homopolymer or copolymer of ethylene and wherein said polymeric resin has a density as measured according to ISO1183 of between 930 and 980 kg/m3, and a peak melting temperature of from 115 to 140° C.; and said polymeric resin is present in an amount of from 5 to 25% by weight based on the total weight of the composite sheet.

The present invention further provides a composite sheet obtainable by a process described above. Such a composite sheet comprises assembled HPPE fibers and a polymeric resin, wherein said polymeric resin comprises a homopolymer or copolymer of ethylene and wherein said polymeric resin has a density as measured according to ISO1183 of between 930 and 980 kg/m$^3$, and a peak melting temperature of from 115 to 140° C. Typically, said composite sheet consists of assembled HPPE fibers and a polymeric resin, wherein said polymeric resin consists of a homopolymer or copolymer of ethylene and wherein said polymeric resin has a density as measured according to ISO1183 of between 930 and 980 kg/m$^3$, and a peak melting temperature of from 115 to 140° C.

A composite sheet according to the present invention is subject to the preferred embodiments and potential advantages as discussed above or below in respect of the present method, whereas the preferred embodiments for the composite potentially apply vice versa for the inventive method.

Preferably, the composite sheet comprises at least one network of the fibers. By network is meant that the fibers are arranged in configurations of various types, e.g. a knitted or woven fabric, a non-woven fabric with a random or ordered orientation of the fibers, a parallel array arrangement also known as unidirectional (UD) arrangement, layered or formed into a fabric by any of a variety of conventional techniques. Preferably, said sheets comprise at least one network of said fibers. More preferably, said sheets comprise a plurality of networks of the fibers. Such networks can be comprised in cut resistant garments, e.g. gloves and also in anti-ballistic products, e.g. ballistic resistant articles, vests, helmets, radomes and tarpaulin. Therefore, the invention also relates to such articles.

A preferred embodiment of the present invention concerns a composite sheet wherein at least 75 wt % of the HPPE fibers are UHMWPE fibers based on the total weight of fibers in the composite sheet. Preferably at least 85 wt %; more preferably at least 95 wt %; most preferably all of the HPPE fibers are UHMWPE fibers based on the total weight of fibers in the composite sheet.

In a preferred embodiment, the composite sheet contains at least one mono-layer made according to the inventive process. The term mono-layer refers to a layer of fibers. In a further preferred embodiment, the mono-layer is a unidirectional mono-layer. The term unidirectional mono-layer refers to a layer of unidirectionally oriented fibers, i.e. fibers that are essentially oriented in parallel. In a yet further preferred embodiment, the composite sheet is multi-layered composite sheet, containing a plurality of unidirectional mono-layers the direction of the fibers in each mono-layer preferably being rotated with a certain angle with respect to the direction of the fibers in an adjacent mono-layer. Preferably, the angle is at least 30°, more preferably at least 45°, even more preferably at least 75°, most preferably the angle is about 90°. Multi-layered composite articles proved very useful in ballistic applications, e.g. body armor, helmets, hard and flexible shield panels, panels for vehicle armoring and the like. Therefore, the invention also relates to ballistic-resistant articles as the ones enumerated hereinabove containing the inventive composite sheets. Preferably the sheet formed by aggregation of HPPE fibers is selected from the list consisting of a woven fabric, a non-woven fabric, a knitted fabric, a layer of unidirectional oriented fibers, a cross-ply of unidirectional oriented fibers or combination thereof.

Another embodiment of the invention relates to a composite sheet, which may be used as a ballistic resistant sheet, comprising at least one, preferably at least 2, monolayers comprised of unidirectionally (UD) oriented fibers and the polymeric resin. Preferably the fiber direction in each monolayer being rotated with respect to the fiber direction in an adjacent monolayer. Several monolayers may be preassembled before their use as ballistic resistant sheet. For that purpose a set of 2, 4, 6, 8 or 10 monolayers may be stacked such that the fiber direction in each monolayer is rotated with respect to the fiber direction in an adjacent monolayer, followed by consolidation. Consolidation may be done by the use of pressure and temperature to form a preassembled sheet, or sub-sheet. Pressure for consolidation generally ranges from 1-100 bar while temperature during consolidation typically is in the range from 60 to 140° C.

The composite sheet may furthermore comprise a so-called separating film, or cover sheet, being a polymeric film with a thickness of preferably from 1 to 20 micrometer, more preferably from 2 to 10 micrometer. The separating film may comprise polyethylene, especially ultra high molecular weight polyethylene, low density polyethylene, polypropylene, thermoplastic polyester or polycarbonate. Most preferably, biaxially-oriented films made from polyethylene, polypropylene, polyethylene terephthalate or polycarbonate are used as separating films. Preferably separating films are employed in combination with low modulus resins for composite sheets in soft ballistic applications.

In a preferred embodiment, the weight, or areal density, of the composite sheet comprising at least one UD monolayer, including the weight of the fibers and matrix material is typically at least 25 g/m$^2$, sometimes from 30 to 300 g/m$^2$, such as from 30 to 280 g/m$^2$. According to some embodiments, the weight or areal density of the monolayer is from 40 to 150 g/m$^2$.

The composite sheet of the invention is very suitable for use in soft ballistic articles, such as bullet-resistant vests. An alternative use of the composite sheet of the invention is in compressed or moulded ballistic resistant articles such as panels and especially curved panels and articles, e.g. inserts, helmets, radomes.

In a preferred embodiment, the present invention further provides a composite sheet comprising unidirectionally aligned ultrahigh molecular weight polyethylene (UHMWPE) fibers and a polymeric resin, wherein said polymeric resin comprises a homopolymer or copolymer of ethylene and wherein said polymeric resin has a density as measured according to ISO1183 of between 930 and 980 kg/m$^3$, and a peak melting temperature of from 115 to 140° C.; and said polymeric resin is present in an amount of from 5 to 25% by weight based on the total weight of the composite sheet.

In a further preferred embodiment the polymeric resin has a storage modulus (E') as measured by dynamic mechanical analysis at 100° C. of at least 20 MPa. Preferably, the polymeric resin comprises from 1 to 40% by weight of either ethylene acrylic acid copolymer, ethylene methacrylic acid copolymer or a combination thereof, based on the total weight of the polymeric resin. Preferably, the composite sheet comprises less than 0.1% by weight of a solvent for said polymeric resin, based on the weight of said polymeric resin. More preferably the composite sheet comprises less than 0.01% by weight of a solvent; most preferably no solvent; for said polymeric resin, based on the weight of said polymeric resin.

It is important that the polymer resin of the suspension remains rigid at higher temperatures. This imparts rigidity at high temperatures to the resulting composite sheet, or ballistic resistant article. Typically the ballistic resistant article has a flexural strength higher than 85 MPa, as measured according to ASTM D790-07. Preferably said flexural strength is higher than 95 MPa; more preferably higher than 105 MPa; most preferably higher than 115 MPa.

The combination of an oriented HPPE fiber with polyolefin polymers is described in EP2488364 where melting of the polyolefin polymer is employed to provide flexible but strong sheets. However such products contain substantial amounts of polyolefin resin or provide an inadequate wetting/distribution of the resin throughout the HPPE structure. Products such as those described in EP2488364 are substantially different from the ones prepared according to the method according to the present invention, amongst others because in the currently presented methods and products the distribution of the polymeric resin is throughout the sheets providing improved properties, for example back face deformation. Furthermore, the impregnation of the HPPE fiber structure in the present invention takes place at substantially lower temperatures and in the absence of hydrocarbon solvents which may avoid alterations of the HPPE fibers and/or their surfaces. After impregnation, the water is removed and the remainder of the suspension is present in a lower amount. The suspension may contain at least one surface active ingredient such as ionic or non-ionic surfactant.

Sheets comprising HPPE fibers coated with a polymer having ethylene or propylene crystallinity are also described in EP0091547, whereby mono- or multifilament fibers are treated at high temperatures with solutions of the polymer in hydrocarbon solvents at a concentration of up to 12 g/L. However, through such hot solvent treatment, the fibers may contain residual amounts of the employed hydrocarbon solvent negatively affecting fiber properties. Furthermore the treatment of the HPPE fiber at high temperature with a hydrocarbon solvent may affect structural properties of the fibers, especially through diffusion of the hydrocarbon solvent and/or polymer into the HPPE filaments. The fiber-polymer interface may be modified by partial etching and dissolution of the HPPE which may affected amongst others the interface as well as the bulk properties of the HPPE fibers. In contrast, the present process may be performed at room temperature and employs a non-solvent for the HPPE, i.e. water. Accordingly the fibers and composite sheets produced by the process of the present invention may have a better retention of the structural properties of the HPPE fibers. The fibers may also present a different surface structure amongst which a better discerned HPPE-coating interfaces compared to the fibers treated at high temperature with a hydrocarbon solvent since no hydrocarbon solvent and/or polymer may diffuse into the HPPE fiber. Furthermore the process and products described in EP0091547 are limited by the amount of polymer present in the hydrocarbon solutions and hence applied to the HPPE fibers. The solutions are limited by their increasing viscosities and high amounts of polymer coating may only be applied by repetition of the coating operation.

A preferred field of application of the composite sheet of the invention is in the field of ballistic resistant articles such as armors. The function of a ballistic resistant article is two-fold, it should stop fast projectiles, and it should do so with a minimum back face deformation. Back face deformation is effectively the size of the impact dent measurable on the non-impact side of the article. Typically it is measured in mm of greatest deformation perpendicular to the plane of the impacted surface of the ballistic resistant article. It was surprisingly observed that the size of the impact dent is small, if composite sheets made according to the present invention are used in armor. In other words, the back face signature is small. Such armor is especially suitable for combat helmet shells, because they show reduced back face signature on stopping projectiles, thus reducing trauma on the human skull and brain after being hit by a stopped projectile.

Methods

Heat of fusion and peak melting temperature are measured according to standard DSC methods ASTM E 794 and ASTM E 793 respectively at a heating rate of 10K/min for the second heating curve and performed under nitrogen on a dehydrated sample.

The density of the polymeric resin is measured according to ISO 1183.

IV: the Intrinsic Viscosity is determined according to method ASTM D1601(2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration.

Tensile properties of HPPE fibers: tensile strength (or strength) and tensile modulus (or modulus) are defined and determined on multifilament yarns as specified in ASTM D885M, using a nominal gauge length of the fiber of 500 mm, a crosshead speed of 50%/min and Instron 2714 clamps, of type "Fiber Grip D5618C". On the basis of the measured stress-strain curve the modulus is determined as the gradient from 0.3 to 1% strain. For calculation of the modulus and strength, the tensile forces measured are divided by the titre, as determined above; values in GPa are calculated assuming a density of 0.97 g/cm$^3$ for the HPPE.

Tensile properties of fibers having a tape-like shape: tensile strength, tensile modulus and elongation at break are defined and determined at 25° C. on tapes of a width of 2 mm as specified in ASTM D882, using a nominal gauge length of the tape of 440 mm, a crosshead speed of 50 mm/min.

Tensile strength and tensile modulus at break of the polyolefin resin are measured according ISO 527-2.

Number of olefinic branches per thousand carbon atoms was determined by FTIR on a 2 mm thick compression moulded film by quantifying the absorption at 1375 cm-1 using a calibration curve based on NMR measurements as in e.g. EP 0 269 151 (in particular pg. 4 thereof).

Areal density (AD) of a panel or sheet is determined by measuring the weight of a sample of preferably 0.4 m×0.4 m with an error of 0.1 g. The areal density of a tape was determined by measuring the weight of a sample of preferably 1.0 m×0.1 m with an error of 0.1 g.

Flexural strength is determined according to ASTM D790-07.

The invention claimed is:

1. A composite sheet comprising:
   unidirectionally aligned high performance polyethylene (HPPE) fibers having a tenacity of at least 1.0 N/tex, wherein at least 75 wt. % of the HPPE fibers, based on total weight of fibers in the composite sheet, are ultra-high molecular weight polyethylene (UHMWPE) fibers; and
   5 to 25% by weight, based on the total weight of the composite sheet, of a polymeric resin having a density as measured according to ISO1183 of between 930 and 980 kg/m$^3$, and a peak melting temperature of from 115 to 140° C.; wherein the polymeric resin comprises, based on the total weight of the polymeric resin:
   (i) at least 50% by weight of a high density polyethylene (HDPE), and
   (ii) from 1 to 40% by weight of either ethylene acrylic acid copolymer, ethylene methacrylic acid copolymer, or a combination thereof.

2. The composite sheet according to claim 1, wherein the polymeric resin has a storage modulus (E') as measured by dynamic mechanical analysis at 100° C. of at least 20 MPa.

3. The composite sheet according to claim 1, wherein the polymeric resin comprises from 10 to 30% by weight of either ethylene acrylic acid or ethylene methacrylic acid, or a combination thereof, based on the total weight of the polymeric resin.

4. The composite sheet according to claim 1, wherein composite sheet is a multilayered material sheet.

5. The composite sheet according to claim 1, wherein the polymeric resin has a density from 960 to 970 kg/m$^3$.

6. The composite sheet according to claim 1, wherein the composite sheet has a flexural strength higher than 85 MPa, as measured according to ASTM D790-07.

7. A ballistic resistant article comprising at least one composite sheet as defined in claim 1.

8. The composite sheet according to claim 1, wherein the ethylene acrylic acid copolymer comprises from 5 to 30% by weight of acrylic acid monomers and wherein the ethylene methacrylic acid copolymer comprises from 5 to 30% by weight of methacrylic acid monomers.

9. The composite sheet according to claim 1, wherein the polymeric resin comprises at least 70% by weight of the HDPE.

10. The composite sheet according to claim 1, wherein the polymeric resin comprises at least 80% by weight of the HDPE.

11. The composite sheet according to claim 1, wherein the polymeric resin comprises at least 90% by weight of the HDPE.

12. The composite sheet according to claim 1, wherein at least 85 wt. % of the HPPE fibers, based on total weight of fibers in the composite sheet, are UHMWPE fibers.

13. The composite sheet according to claim 1, wherein at least 95 wt. % of the HPPE fibers, based on total weight of fibers in the composite sheet, are UHMWPE fibers.

14. The composite sheet according to claim 1, wherein all of the HPPE fibers are UHMWPE fibers.

15. A method for manufacturing the composite sheet according to claim 1, wherein the method comprises the steps of:

a) providing the high performance polyethylene (HPPE) fibers having a tenacity of at least 1.0 N/tex;

b) assembling the HPPE fibers to form a sheet;

c) applying an aqueous suspension of the polymeric resin to the HPPE fibers before, during or after assembling;

d) at least partially drying the aqueous suspension of the polymeric resin applied in step c) to obtain the composite sheet upon completion of steps a), b), c) and d);

e) optionally applying a temperature in the range from the melting temperature of the resin to 153° C. to the sheet of step c) before, during and/or after step d) to at least partially melt the polymeric resin; and f) optionally applying a pressure to the composite sheet before, during and/or after step e) to at least partially compact the composite sheet.

16. The method according to claim 15, further comprising adding one or more further layers of polymeric material to the composite sheet after any one of steps c), d), e) or f).

17. The method according to claim 15, wherein the polymeric resin has a storage modulus (E') as measured by dynamic mechanical analysis at 100° C. of at least 20 MPa.

* * * * *